(12) United States Patent
Duschatko et al.

(10) Patent No.: US 6,801,548 B1
(45) Date of Patent: Oct. 5, 2004

(54) CHANNEL ORDERING FOR COMMUNICATION SIGNALS SPLIT FOR MATRIX SWITCHING

(75) Inventors: Douglas E. Duschatko, McKinney, TX (US); Lane B. Quibodeaux, Allen, TX (US); Robert A. Hall, Richardson, TX (US); Andrew J. Thurston, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 802 days.

(21) Appl. No.: 09/608,461

(22) Filed: Jun. 30, 2000

Related U.S. Application Data

(60) Provisional application No. 60/211,834, filed on Jun. 15, 2000.

(51) Int. Cl.[7] .................. H04L 12/28; H04Q 11/00; H04J 3/16; H04J 14/00
(52) U.S. Cl. .................. 370/537; 370/386; 370/395; 370/468; 359/46
(58) Field of Search .................. 370/216, 242, 370/252, 238, 235, 395, 397, 398, 409, 419, 468, 503, 537; 709/238, 232, 241, 242; 714/700, 800, 824; 398/46, 48, 49, 50

(56) References Cited

U.S. PATENT DOCUMENTS

| | | | | |
|---|---|---|---|---|
| 5,309,441 A | * | 5/1994 | Kuroda | 370/105 |
| 5,623,356 A | * | 4/1997 | Kaminow et al. | 398/46 |
| 5,982,746 A | * | 11/1999 | Hanson et al. | 370/220 |
| 6,122,249 A | * | 9/2000 | Mochizuki et al. | 370/220 |
| 6,147,968 A | * | 11/2000 | De Moer et al. | 370/225 |
| 6,298,038 B1 | * | 10/2001 | Martin et al. | 370/216 |
| 6,301,254 B1 | * | 10/2001 | Chan et al. | 370/397 |
| 6,317,439 B1 | * | 11/2001 | Cardona et al. | 370/503 |
| 6,493,847 B1 | * | 12/2002 | Sorgi et al. | 714/800 |
| 6,501,758 B1 | * | 12/2002 | Chen et al. | 370/395 |
| 6,608,836 B2 | * | 8/2003 | Mao et al. | 370/419 |
| 6,628,657 B1 | * | 9/2003 | Manchester et al. | 370/395 |
| 6,631,134 B1 | * | 10/2003 | Zadikian et al. | 370/395 |
| 6,724,757 B1 | * | 4/2004 | Zadikian et al. | 370/388 |
| 6,735,197 B1 | * | 5/2004 | Duschatko et al. | 370/386 |

* cited by examiner

Primary Examiner—Man Phan
(74) Attorney, Agent, or Firm—Campbell Stephenson Ascolese LLP

(57) ABSTRACT

An apparatus and method for a synchronous optical network (SONET) includes ordering a plurality of signals of a first type in one or more line cards for transmit to one or more types of line cards, wherein the ordering of the first type of signals creates a plurality of independent signals of a second type, and transmitting the plurality of the first type of signals to the one or more types of line cards, wherein the independence of the signals of the second type permits the one or more types of signals of the second type to be in an arbitrary order. The method and apparatus includes ordering in a plurality of modules to assign to a variable A a number of basic modules on the one or more line cards, assign to a variable B a number of processors adapted for STS-N signals on the one or more line cards, calculate a variable C by dividing A by B, C being the number of basic module channels common to each of the processors, calculate a variable D by dividing C by three, D being a number of contiguous channels, divide each STS-N signal into N/D portions, each portion including up to D bytes, and for each portion of the STS-N signal, select one of the number of processors adapted for STS-N signals, and transmit the portion of the STS-N signal to the one of the number of processors.

33 Claims, 9 Drawing Sheets

| A1 1502 | A2 1504 | J0<br>Z0 1506<br>U | | Payload Bytes 1590 |
|---|---|---|---|---|
| B1 1510 | E1<br>U 1512 | F1<br>U 1514 | | Payload Bytes 1591 |
| D1<br>U 1520 | D2<br>U 1522 | D3<br>U 1524 | | Payload Bytes 1592 |
| H1 1530 | H2 1532 | H3 1534 | H4 1536 | Payload Bytes 1593 |
| B2<br>U 1540 | K1<br>U 1542 | K2<br>U 1544 | | Payload Bytes 1594 |
| D4<br>U 1550 | D5<br>U 1551 | D6<br>U 1552 | | Payload Bytes 1595 |
| D7<br>U 1553 | D8<br>U 1554 | D9<br>U 1555 | | Payload Bytes 1596 |
| D10<br>U 1556 | D11<br>U 1557 | D12<br>U 1558 | | Payload Bytes 1597 |
| S1<br>Z1 1570<br>U | M1<br>Z2 1572<br>U | E2<br>U 1574 | | Payload Bytes 1598 |

SONET Frame 1500

Fig. 6

CHANNEL ORDERING FOR COMMUNICATION SIGNALS SPLIT FOR MATRIX SWITCHING

This application claims the benefit of U.S. provisional Patent Application No. 60/211,834, filed Jun. 15, 2000.

CROSS-REFERENCES TO RELATED APPLICATIONS

This application is related to patent application Ser. No. 09/477,166, filed Jan. 4, 2000, and entitled "METHOD AND APPARATUS FOR A REARRANGEABLY NON-BLOCKING SWITCHING MATRIX," having A. N. Saleh, D. E. Duschatko and L. B. Quibodeaux as inventors. This application is assigned to Cisco Technology, Inc., the assignee of the present invention, and is hereby incorporated by reference, in its entirety and for all purposes.

This application is related to patent application Ser. No. 09/232,395, filed Jan. 15, 1999, and entitled "A CONFIGURABLE NETWORK ROUTER," having H. M. Zadikian, A. N. Saleh, J. C. Adler, Z. Baghdasarian, and V. Parsi as inventors. This application is assigned to Cisco Technology, Inc., the assignee of the present invention, and is hereby incorporated by reference, in its entirety and for all purposes.

This application is related to patent application Ser. No. 09/608,097 having attorney docket no. M-8321 US filed Jun. 30, 2000, and entitled "CONCATENATION DETECTION ACROSS MULTIPLE CHIPS," having Douglas E. Duschatko, Lane Byron Quibodeaux, Robert A. Hall, Andrew J. Thurston as inventors. This application is assigned to Cisco Technology, Inc., the assignee of the present invention, and is hereby incorporated by reference, in its entirety and for all purposes.

This application is related to patent application Ser. No. 09/607,912 having attorney docket no. M-8320 US filed Jun. 30, 2000, and entitled "PATH AIS INSERTION FOR CONCATENATED PAYLOADS ACROSS MULTIPLE CHIPS," having Douglas E. Duschatko, Lane Byron Quibodeaux, Robert A. Hall, Andrew J. Thurston as inventors. This application is assigned to Cisco Technology, Inc., the assignee of the present invention, and is hereby incorporated by reference, in its entirety and for all purposes.

This application is related to patent application Ser. No. 09/609,577 having attorney docket no. M-8209 US filed Jun. 30, 2000, and entitled "FIXED ALGORITHM FOR CONCATENATION WIRING," Vahid Parsi and Andrew J. Thurston as inventors. This application is assigned to Cisco Technology, Inc., the assignee of the present invention, and is hereby incorporated by reference, in its entirety and for all purposes.

BACKGROUND OF THE INVENTION

1. Field of the Invention

The present invention relates to data communications, and, more particularly, efficiency in data communication circuits.

2. Description of the Related Art

A data communications network is the interconnection of two or more communicating entities (i.e., data sources and/or sinks) over one or more data links. A data communications network allows communication between multiple communicating entities over one or more data communications links. High bandwidth applications supported by these networks include streaming video, streaming audio, and large aggregations of voice traffic. In the future, these demands are certain to increase. To meet such demands, an increasingly popular alternative is the use of lightwave communications carried over fiber optic cables. The use of lightwave communications provides several benefits, including high bandwidth, ease of installation, and capacity for future growth.

The synchronous optical network (SONET) protocol is among those protocols designed to employ an optical infrastructure and is widely employed in voice and data communications networks. SONET is a physical transmission vehicle capable of transmission speeds in the multi-gigabit range, and is defined by a set of electrical as well as optical standards.

In some networks, network nodes store data which they use for proper operation. In SONET, data between adjacent nodes are transmitted in modules called STS's (synchronous transport signals). Each STS is transmitted on a link at regular time intervals (for example, 125 microseconds). See Bellcore Generic Requirements document GR-253-CORE (Issue 2, December 1995) incorporated herein by reference. An STS-1 is a defined as a specific sequence of 810 bytes (6480 bits) including overhead bytes and an envelope capacity for transporting payloads. An STS-N frame is a sequence of N×810 bytes wherein N is a predetermined number. An STS-N is formed by byte-interleaving of STS-1 and STS-M modules, wherein M is less than N.

Ordering communication channels for STS-N signals entering a switching matrix using standard SONET multiplexing order requires level 1 switching (STS-1 type switching). Level 1 switching is complicated and is an inefficient way to switch signals. What is needed is a non-standard SONET multiplexing order that does not require level 1 switching and that allows efficient switching of the STS-N signals.

SUMMARY OF THE INVENTION

The present invention provides a non-standard SONET multiplexing order that does not require level 1 switching and that allows efficient switching of STS-N signals. This ordering of communication channels allows an STS-N signal to be processed by a selected STS-N pointer processor ASIC.

Pointer processing and matrix switching are simplified using the channel ordering method. STS-1 level switching is not required. The invention allows an STS-N signal from an OC line card to be communicated without requiring reordering of STS-N signals by the switching matrix.

According to an embodiment, an apparatus and method for a synchronous optical network (SONET) includes ordering a plurality of signals of a first type in one or more line cards for transmit to one or more types of line cards, wherein the ordering of the first type of signals creates a plurality of independent signals of a second type, and transmitting the plurality of the first type of signals to the one or more types of line cards, wherein the independence of the signals of the second type permits the one or more types of line cards to be in an arbitrary order. The permitting the one or more types of line cards to be in an arbitrary order eliminates a need to reorder the plurality of the first type of signals in a switching matrix. A method according to an embodiment includes demultiplexing the plurality of signals of the first type in a switching matrix, wherein the demultiplexing is independent of reducing the plurality of signals of the first type to a basic module, such as a synchronous transport signal at level 1.

According to a further embodiment, the method includes matching the plurality of the first type of signals from the line card to one or more types of line cards in a predetermined order, the one or more types of line cards adapted to receive one or more types of signals.

In an embodiment, the method is for the plurality of signals of the first type, synchronous transport signals (STS) having N modules (STS-N), wherein the ordering includes assigning to a variable A a number of basic modules on the one or more line cards, assigning to a variable B a number of processors adapted for STS-N signals on the one or more line cards, calculating a variable C by dividing A by B, C being the number of basic module channels common to each of the processors, calculating a variable D by dividing C by three, D being a number of contiguous channels, dividing each STS-N signal into N/D portions, each portion including up to D bytes, and for each portion of the STS-N signal, selecting one of the number of processors adapted for STS-N signals, and transmitting the portion of the STS-N signal to the one of the number of processors.

BRIEF DESCRIPTION OF THE DRAWINGS

The present invention may be better understood, and its numerous objects, features, and advantages made apparent to those skilled in the art by referencing the accompanying drawings.

FIG. 6 illustrates a standard frame of the synchronous optical network protocol.

The use of the same reference symbols in different drawings indicates identical items unless otherwise indicated.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

In addition, the division of the detailed description into separate sections is merely done as an aid to understanding and is in no way intended to be limiting.

AN EXEMPLARY NETWORK ELEMENT

Figure 1A:
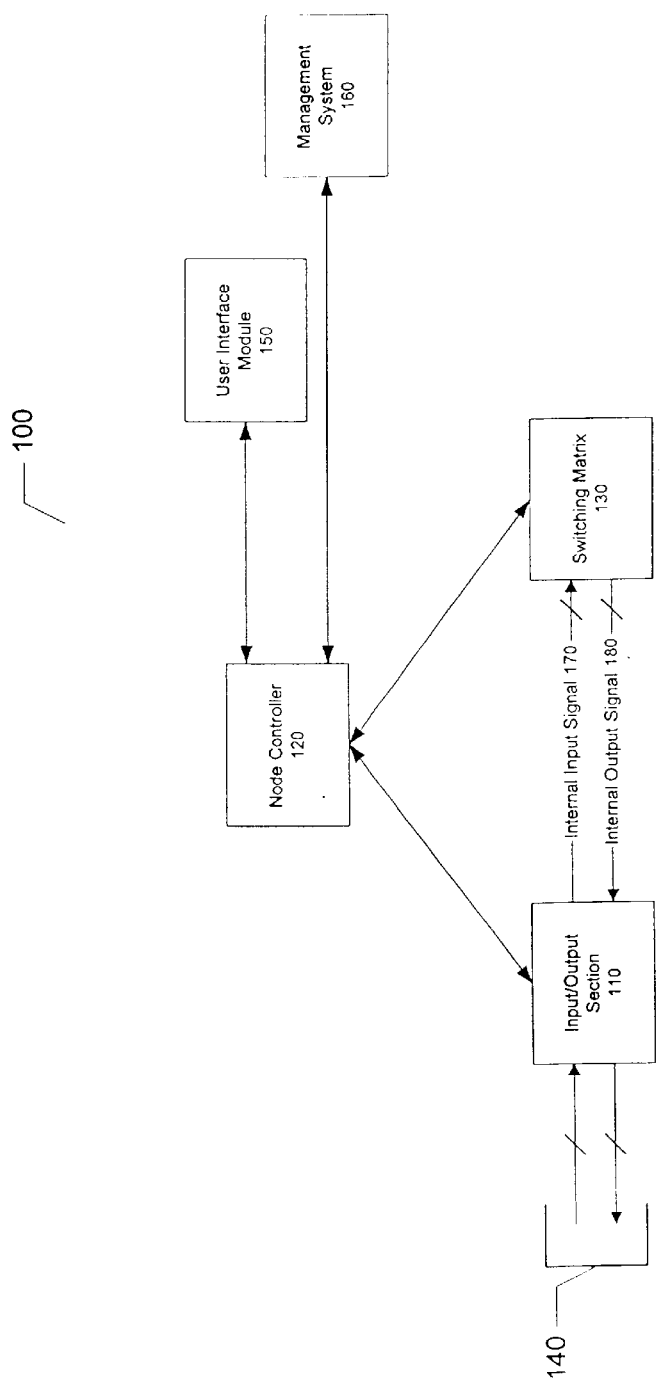
FIG. 1A is a block diagram of an exemplary router.

FIG. 1A illustrates a router 100. Router 100 includes an input/output section 110, a node controller 120, and a switching matrix 130. Node controller 120 contains, for example, real time software and intelligent routing protocols (not shown). Router 100 supports interfaces including, but not limited to, optical signal interfaces 140 (e.g., SONET), a user interface module 150, and a management system 160. Internal input signals 170 and internal output signals 180 may be electrical or optical in nature.

Figure 1B:
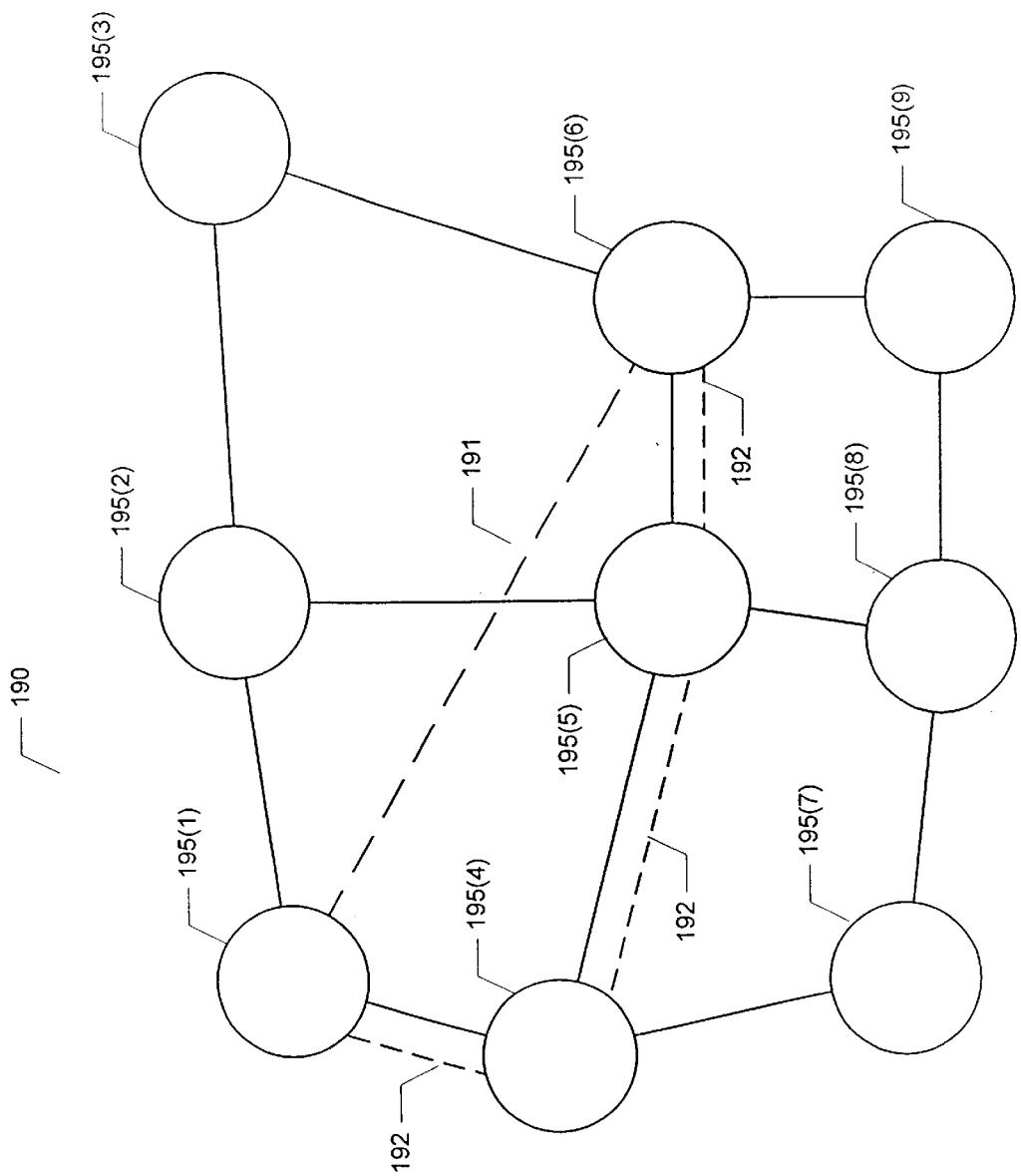
FIG. 1B is a block diagram of a network including a number of the routers of FIG. 1A.

FIG. 1B illustrates a network 190 that includes a number of nodes, network nodes 195(1)–(N). One or more of network nodes 195(1)–(N) can be a router such as router 100. Network 190 can thus support the automatic provisioning, testing, restoration, and termination of virtual paths (exemplified by a virtual path 191) over a physical path (exemplified by a physical path 192) from one of network nodes 195(1)–(N) to another of network nodes 195(1)–(N).

In one embodiment, there are at least three types of processors in a router 100. The lowest level, level-3, resides on the line card and is responsible for all real time aspects of the processing of the physical protocol (e.g., SONET). In a SONET implementation, every level-3 processor is responsible for a single optical signal (e.g., an OC-48 signal) and, via a protocol processor, performs all required SONET/SDH section and line termination functions. The fast response time required from the level-3 processor makes a firmware implementation preferable. The firmware, which may be written in the "C" or "C++" programming languages, assembler, or other programming language, is preferably optimized for low latency and resource efficiency. Higher-level processing is implemented on a separate module, the shelf processor module, which is shared by several line cards.

The second level of processors, level-2, reside on a shelf and main matrix processor modules. The software on the shelf processor module is responsible for managing and controlling line cards. Only half the line cards supported are active at any one time in order to support 1+1 protection. A level-2 processor deals with tasks that require a reasonable response time (for example, on the order of milliseconds), but have no direct impact on the data path. In other words, missed events, such as hardware interrupts, do not result in bit errors. Some of the functions handled by the shelf processor include the periodic collection of maintenance data from the line cards, receiving and processing periodic keep-alive messages from those cards, shelf startup and configuration, proxy management, and other related functions.

The third processor level, level-1, resides on a system processor module and provides system-wide management and control services. In one embodiment, there are preferably two fully synchronous copies of the level-1 processor in the system, both of which are simultaneously active and, through a dedicated and redundant high-speed link, keep their run-time and stored databases fully synchronized. One of the two processors is designated the master and is responsible for all level-1 processing. An update message is sent to the second processor whenever a change is made to the database and before that change is effected. A periodic keep-alive mechanism allows either copy of the system controller to detect failures on the other copy.

Router 100 provides yet another type of processor, referred to herein as a route processor. Such a processor is dedicated to the path/route discovery and restoration functions. The route processor is responsible for receiving failure indications from the line cards, calculating a new route for failed connections, and sending reconfiguration requests to all affected nodes, including its own.

Hardware Architecture

In one embodiment, router 100 can be used, for example, as SONET/SDH line terminating equipment (LTE) capable of terminating the Section and Line overheads of received OC-48 signals, and cross-connects those signals according to provisioned input-output mappings. Some of the terminated signals can optionally be protected using any of the common protection schemes (1+1, 1:1, and 1:N). Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/duplexing, and similar duties.

Signal Path

Figure 2:
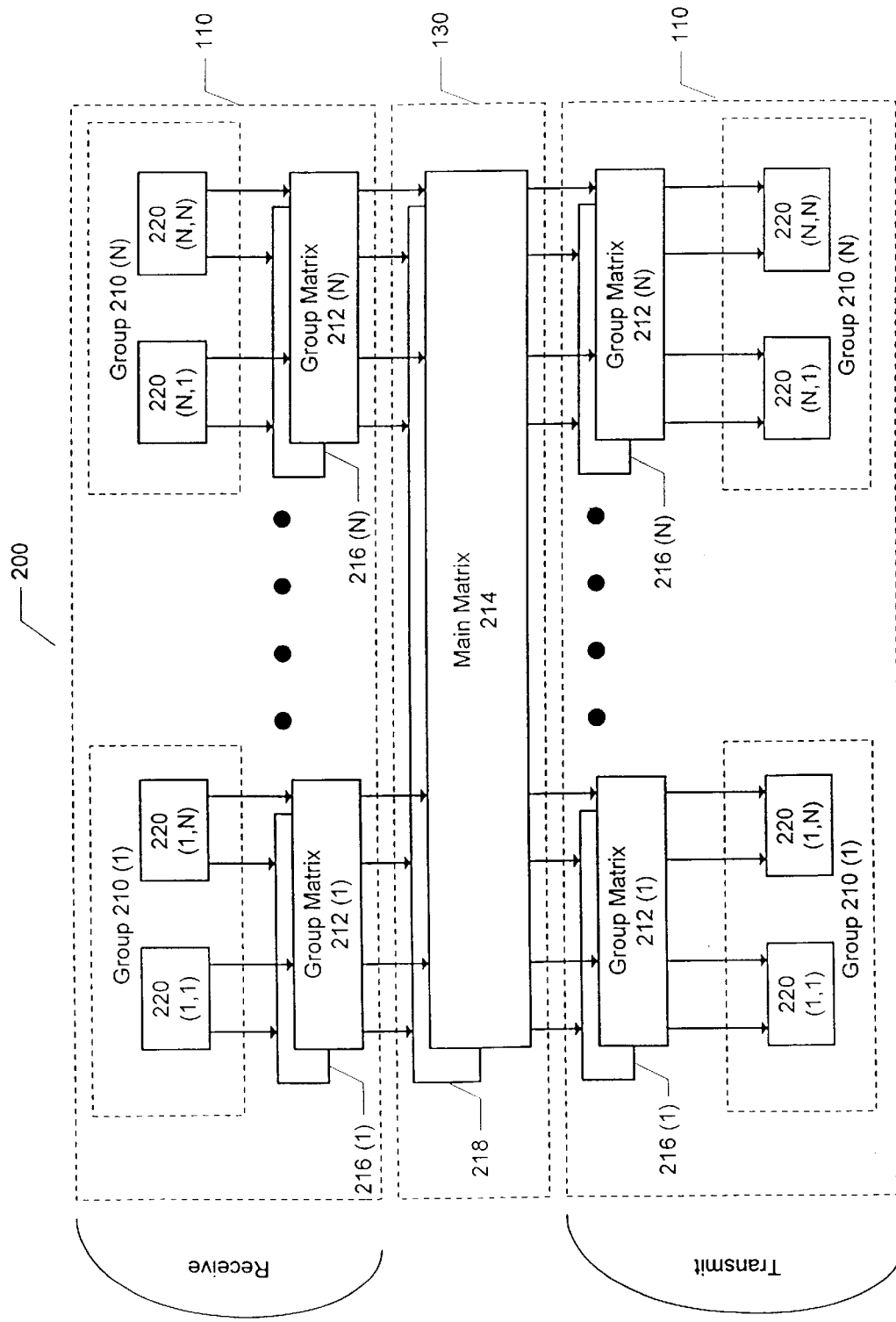
FIG. 2 is a block diagram of the signal paths and functional blocks of the router of FIG. 1A.

FIG. 2 is a block diagram of signal paths 200 within router 100. The primary signal paths in router 100 include one or more groups exemplified by groups 210(1)–(N), group matrices 212(1)–(N), and a main matrix 214. As depicted in FIG. 1A, groups 210(1)–(N), and group matrices 212(1)–(N) are shown as having receive and transmit sections. Groups 210(1)–(N) each include line cards 220(1,1)–(1,N), through line cards 220(N,1)–(N,N). Signals from line cards 220(1, 1)–(N,N) are sent to the corresponding group matrix. In one embodiment, two sets of the group matrix cards, group matrices 212(1)–(N) and 216(1)–(N) are employed. Main matrix 214 is also mirrored in one embodiment by a redundant copy, a backup main matrix 218, which together form switching matrix 130. As shown in FIG. 2, the redundancy for group matrices 212(1)–(N) (i.e., group matrices 216(1) –(N)), is also provided on the transmit side.

It will be noted that the variable identifier "N" is used in several instances in FIG. 2 (and subsequent use of other variables, such as "m," "x," "k," and others) to more simply designate the final element (e.g., group matrix 212(N), line card 220(N,N), and so on) of a series of related or similar elements (e.g., group matrices 212(1)–(N), line cards 220 (1,1)–(N,N), and so on). The repeated use of such variable identifiers is not meant to imply a correlation between the sizes of such series of elements. The use of such variable identifiers does not require that each series of elements has the same number of elements as another series delimited by the same variable identifier. Rather, in each instance of use, the variable identified by "N" (or "m," "x," "k," and others) may hold the same or a different value than other instances of the same variable identifier. For example, group matrix 212(N) may be the tenth group matrix in a series of group matrices, whereas line card 220(N,N) may be the forty-eighth line card in a series of line cards.

Using signal paths 200 as an example, data enters the system at one of line cards 220(1,1)–(N,N). It is at this point, in a SONET-based system, that the Section and Line overheads are processed and stripped off by a protocol processor (not shown). The extracted SONET/SDH payload envelope is then synchronized with the system clock and sent to two different copies of a local matrix, depicted as group matrices 212(1)–(N) and 216(1)–(N) in FIG. 1A. In one embodiment, group matrices 212(1)–(N) and 216(1)–(N) are used mainly as 2:1 reduction stages that select one of two optical signals and pass the selected optical signal to switching matrix 130. This allows the implementation of a variety of protection schemes (including 1:N, or 0:1) without having to use any additional ports on main matrix 214. All protect signals are terminated at group matrices 212(1)–(N) and 216(1)–(N). In order to maximize bandwidth, it is preferable that only active signals be passed through to switching matrix 130.

In one embodiment, switching matrix 130 is an errorless, rearrangeably non-blocking switching network. In one embodiment, switching matrix 130 is a 256×256 switching network that consists of three columns and 16 rows of 16×16 switching elements that allow any of their inputs to be connected to any of their outputs. A single copy of the matrix may be housed, for example, in a single rack that contains three shelves, one for each column (or stage) of the matrix. Each one of such shelves contains cards housing the 16 switching elements in each stage. The switching element itself includes, for example, a 16×16 crosspoint switch, with optical transceivers, and a microcontroller for controlling the crosspoint switch and providing operational feedback to the level-2 processor. Communications between the two processors may be carried, for example, over an Ethernet connection. The level-2 processor in turn communicates with the level-1 and route processors.

The switching elements in each matrix copy of the exemplary embodiment may be connected using fiber-optic cables, for example. While copper cabling may also be employed, such an option may not offer the speed and number of connections provided by an optical arrangement. After passing through the stages of switching matrix 130, an optical signal may be routed to an I/O shelf that (optionally) splits the optical signal into two signals.

One of the signals is sent to an active line card, while the other, when available, is sent to a backup card. Line cards 220(1,1)–(N,N) receive optical signals from group matrices 212(1)–(N) and 216 (1)–(N) which are in turn connected to two separate copies of the main matrix. Line cards 220(1, 1)–(N,N) monitor both signals for errors and, after a user-defined integration period, switch to the backup signal if that signal exhibits better bit error rate (BER) performance than the prior active signal. This scheme, referred to herein as 1-plus-1, allows line cards 220(1,1)–(N,N) to select between the two copies of the group matrix without any level-1 or level-2 CPU intervention. This helps to ensure that such a switch can be made in 50 ms or less (per Bellcore's recommendations in GR-253 (GR-253: Synchronous Optical Network (SONET) Transport Systems, Common Generic Criteria, Issue 2 [Bellcore, December 1995], included herein by reference, in its entirety and for all purposes)). The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Control Path

Figure 3:
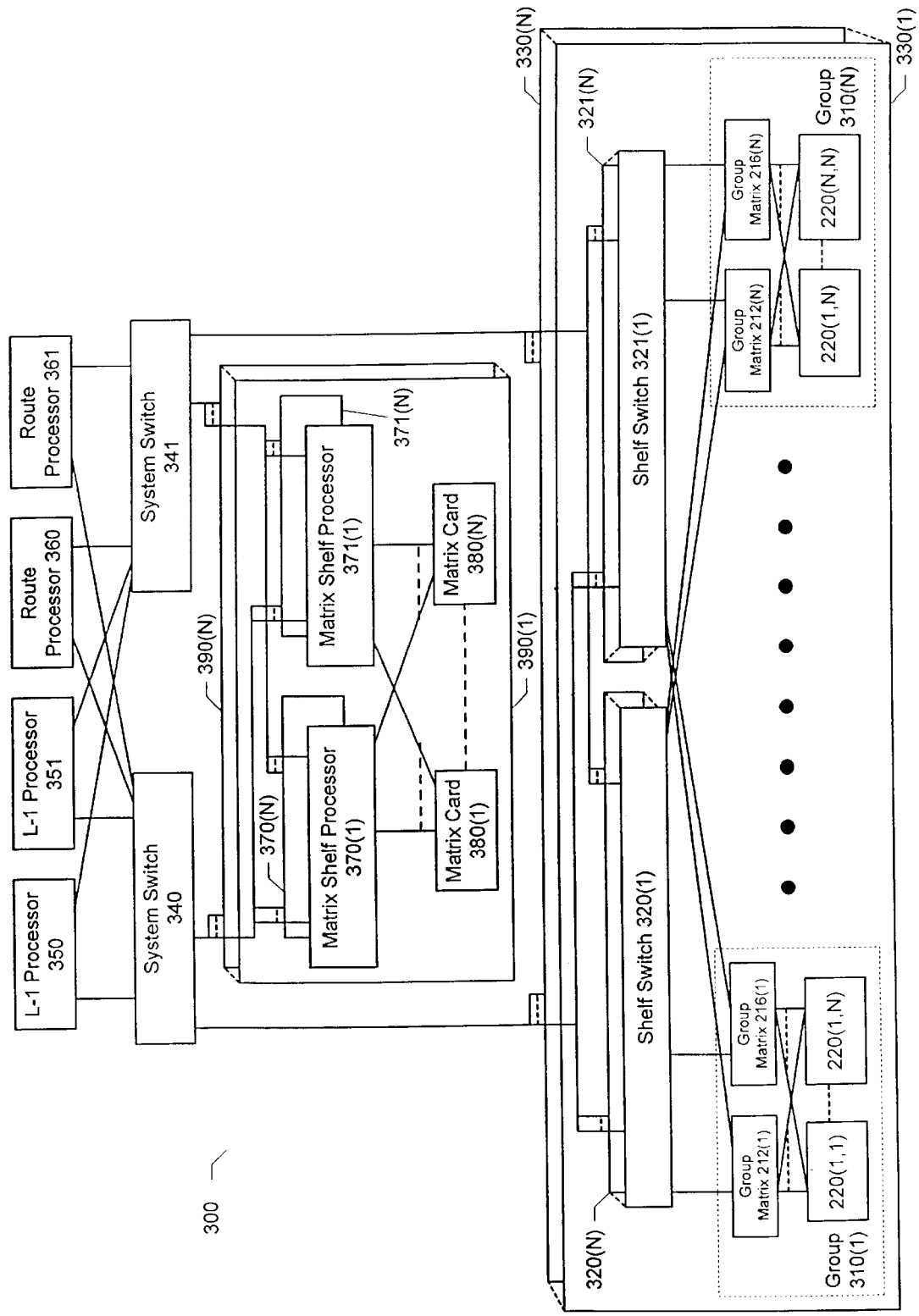
FIG. 3 is a block diagram of the control paths of the router of FIG. 1A.

FIG. 3 illustrates a control path 300 of a router, such as router 100. Control path 300 includes all non-payload-related flows within the system and the hardware and software necessary to the control of the signal paths illustrated in FIG. 2. All major control flows are carried over an internal local area network (LAN), which is, for example, a collection of switched Ethernet segments. The structure of the internal LAN is hierarchical and can be created using a mixture of 10 Mbps and 100 Mbps Ethernet segments, for example. Higher-speed segments (e.g., gigabit Ethernet) can be used as well.

Groups

At the bottom of the hierarchy is what is referred to herein as a group matrix, or a Group Ethernet Repeater in a system using Ethernet communications, and depicted in FIG. 3 as group matrices 212(1)–(N) and 216(1)–(N). Each one of group matrices 212(1)–(N) and 216(1)–(N), also referred to herein as a hub, a repeater, or concentrator, is a physical layer device and preferably supports a star network topology, such as the IEEE 802.3 10BASE-T networking standard. The redundant connections from line cards 220(1, 1)–(N,N) in each of groups 310(1)–(N) are connected to two repeaters that reside on two separate copies of the group matrix module. Preferably, each one of line cards 220(1,1) –(N,N) supports two network ports (e.g., 10BASE-T Ethernet ports). The two sets of four signals from each port pass through a relay that selects one of them for connection to the LAN for purposes of redundancy. Groups 310(1)–(N) represent the first layer of the control bus hierarchy. Group matrices 212(1)–(N) and 216(1)–(N) are each controlled by a shelf processor (not shown, for the sake of clarity) and communicate with one of the shelf switches described below via LAN connections.

Shelf Ethernet Switch

FIG. 3 also illustrates certain features of router 100 pertaining to the relationship between shelf switches 320(1) –(N) and 321 (1)–(N), and groups 310(1)–(N). Groups 310(1)–(N) are again shown, with regard to the control functions thereof. In this depiction of groups 310(1)–(N), line cards 220(1,1)–(N,N) are shown as being attached to networking devices, indicated here as group matrices. Group matrices 212(1)–(N) and 216(1)–(N) may be, for example, multi-port Ethernet hubs running at 10 Mbps. Each of line cards 220(1,1)–(N,N) feed signals into two of group matrices 212(1)–(N) and 216(1)–(N). For example, line card 220(1,1) feeds received information to group matrices 212 (1) and 216(1). Group matrices 212(1)–(N) and 216(1)–(N) each feed a signal into shelf switches 320(1)–(N) and 321(1)–(N) of FIG. 2. Shelf switches 320(1)–(N) and 321 (1)–(N) are each controlled by a shelf processor (not shown for the sake of clarity) and communicate with one of the system switches (not shown, for the sake of clarity).

Shelf switches 320(1)–(N) and 321(1)–(N) are the next higher level of the control hierarchy in router 100, and are located on the shelf processor module (exemplified by line racks (330(1)–(N)). Each copy of shelf switches 320 (1)–(N) and 321(1)–(N) interconnects six connections from the three groups in each shelf, another connection from the shelf processor, and one connection from system switch 340 (and 341). Shelf switches 320(1)–(N) and 321(1)–(N) can be implemented, for example, using an 8-port Ethernet configured to handle Mbps Ethernet traffic and a single-port, dual-rate switch (e.g., 10 Mbps/100 Mbps Ethernet).

System Switch

The next level of the hierarchy is the system switch, of which there are two copies in each router. These are shown as system switches 340 and 341 in FIG. 3. This fully redundant scheme prevents failures on one switch from taking down the entire control bus. In one embodiment, a system switch manages connections from the following sources:

1. High-speed connection(s) from shelf switches 320(1) –(N) and 321(1)–(N);
2. High-speed connection(s) to higher-level processors (e.g., redundant level-1 processors 350 and 351, and redundant route processors 360 and 361); and
3. High-speed connection(s) to matrix shelf processors 370(1)–(N) and 371(1)–(N) which, in turn, control matrix cards 380(1,1)–(1,N)), located in main matrix racks 390(1) –(N).

It will be noted that main matrix 214 includes matrix cards 380(,1)–(1,N), and that, more generally, main matrices 214 and 218 are included matrix racks 390(1)–(N).

System switches 340 and 341 are located in a management bay. As noted, the fully redundant switches manage connections from various router elements, such as I/O and matrix bays, level-1 processors, and route processors. Each of level-1 processors 350 and 351 and route processors 360 and 361 is preferably connected to system switches 340 and 341 using 1100 Mbps Ethernet connections in a configuration that creates an expandable, efficient, and fully redundant control bus.

PHYSICAL CONFIGURATIONS AND METHODS

System Modules

Line Card

Figure 4:
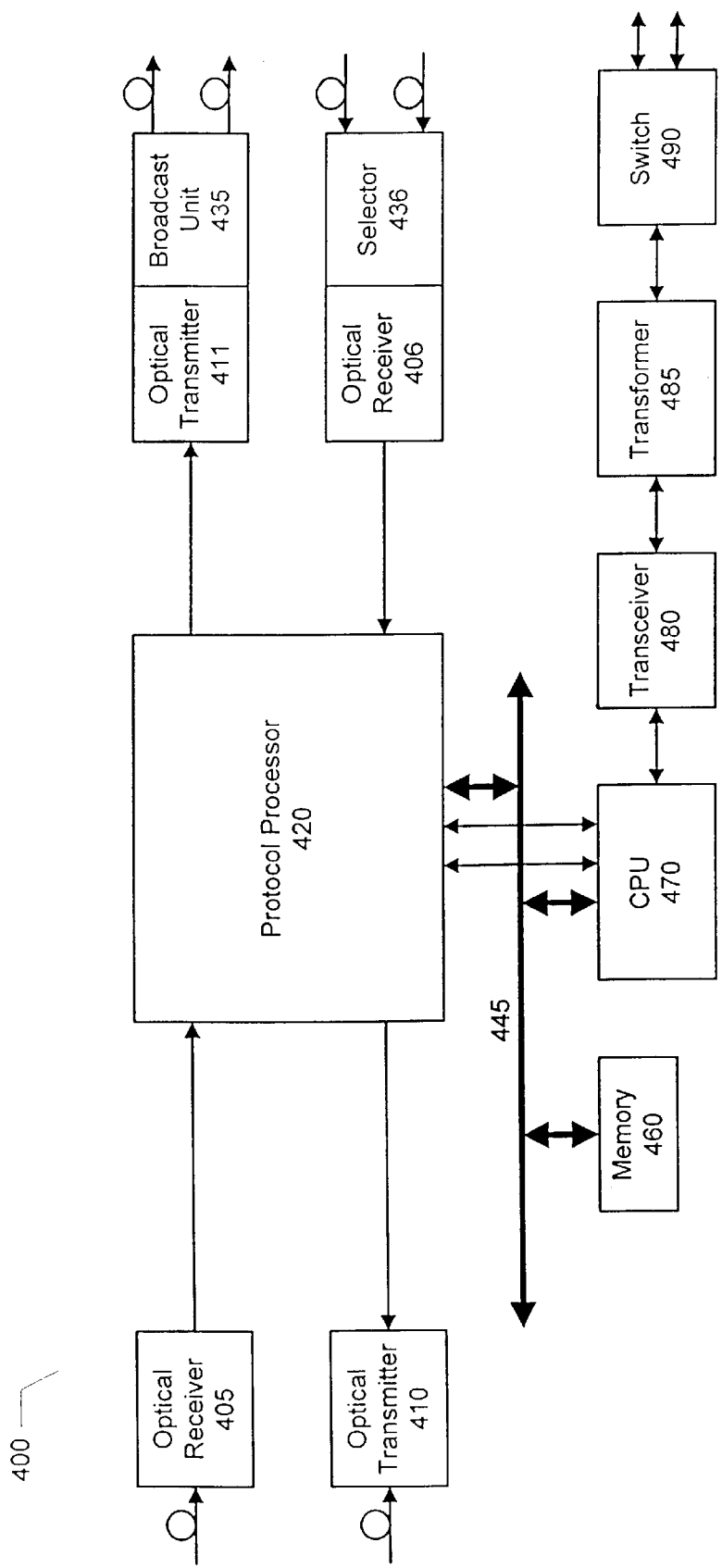
FIG. 4 illustrates the major components of one of the line cards.

FIG. 4 illustrates the major components of one of line cards 220(1,1)–(N,N), exemplified in FIG. 4 by a line card 400. A line card integrates all the necessary hardware and software functions to properly terminate the physical layer. In a SONET implementation, a line card terminates the transport overhead (Section+Line) of a full duplex OC-48 signal. Other components on this card provide a redundant optical connection to the switch matrix, and a communication channel to other modules in the system.

Line card 400 receives optical signals from other network elements via a line-side optical receiver 405 and from the local router's system via a system-side optical receiver 406. Each of these receivers implements an optical-to-electrical (O/E) conversion function. Line card 400 transmits optical signals to other network elements using a line-side optical transmitter 410 and to the group matrices using a system-side optical transmitter 411. Each of these transmitters implements an electrical-to-optical (E/O) conversion function. It will be noted that line-side refers to the side of the line card coupled to other network elements and system-side refers to the side of the line card coupled to the group matrices.

Line-side optical receiver 405 is coupled to a protocol processor 420 which performs clock recovery multiplexing, demultiplexing, and SONET STE/LTE processing in both directions. Similarly, system-side optical receiver 406 is also coupled to protocol processor 420 to allow protocol processor 420 to receive optical signals. The processed electrical signals from protocol processor 420 are coupled to the transmitters 410 and 411. The clock recovery functions are combined with demultiplexers and multiplexers to support reception and transmission of the optical data, respectively. The multiplexers serialize output data generated in protocol processor 420 by performing parallel-to-serial conversion on the parallel data. In contrast, de-multiplexers are used in protocol processor 420 to perform serial-to-parallel conversion on received data.

In order to add protection channels, system-side optical transmitter 411 is also coupled to a 1:2 broadcast unit 435. To receive such optical signals, optical receiver 406 is also coupled to a 2:1 selector 436 in order to select the working channel before the optical signals leave the shelf and thus prevent the standby channel (also referred to herein as the protect channel) from using any bandwidth on switching matrix 130.

Protocol processor 420 is coupled to a bus 445. Protocol processor 420 interfaces the line card to two copies of the matrix in a 1+1 physical protocol. In a SONET implementation, protocol processor 420 provides both STE/LTE processing according to published industry standards. Also coupled to bus 445 are a memory 460 and a CPU 470. Memory 460 should be fast enough for efficient operation of CPU 470.

CPU 470 communicates with other of line cards 220(1,1)–(N,N) over a control bus (not shown) using a transceiver 480 that is coupled to CPU 470. Transceiver 480, is coupled to a transformer 485 which is coupled to a switch 490. Switch 490 is coupled to the control bus. Switch 490 implements a 1:1 protection scheme for transceiver 480 and couples CPU 470 to two independent ports on the backplane (not shown). Each of the two ports connects to one copy of the hub of the group matrix. This allows the software on the line card to switch to the backup link when the software detects failures on the active link.

Preferably, CPU 470 includes numerous integrated peripherals including embedded SCC channels (e.g., in-band communications) and an Ethernet controller (for example, to support communications with other system modules). In one embodiment, CPU 470 provides an onboard communications processor module (not shown) that handles time-critical aspects of the protocols supported.

Hub

One or more hubs are also provided to support communication between the group matrices and system switches in router 100. In an Ethernet communications environment, the hub's functions are carried out primarily by repeater interface controllers (RICs). Each RIC integrates the functions of a repeater, clock and data recovery unit (CDR), Manchester encoder/decoder, and transceiver. Each RIC has a set of registers that convey status information and allow a number of configuration options to be specified by the user using, for example, a microcontroller.

Shelf Processor Module

A shelf processor module provides, among other elements, a shelf processor and switch that interconnect the LAN segments from the groups and the shelf processor to a port on the shelf switch.

The shelf processor is responsible for the overall operation, management, and control of the shelf.

A network switch interconnects the lower speed interprocessor communication network segments in each shelf. In one embodiment, the network switch provides support for 10 Mbps and 100 Mbps segments.

In certain embodiments, the shelf processor is able to connect to two separate Ethernet segments. This can implement a 1:1 protection scheme that allows the shelf processor to recover from failures on the active segment by simply switching to the other segment.

System Switch

One embodiment of a system capable of interconnecting network segments in a switched configuration allows communications between shelf switches, higher-level (e.g., level-1) processors, and shelf-processors. In an Ethernet-based system, the system switch supports both 10 Mbps and 100 Mbps connections. The segments come from the shelf switching in the I/O shelf and the matrix switches, among others, and allow these elements to communicate.

Management Bay

The management bay can house, for example, the following modules:

1. Level-1 processors, or system controllers, and their associated storage devices;
2. Route processors;
3. Optional group and WAN cards;
4. System Ethernet switches; and
5. Synchronization modules.

All of the above modules are fully redundant and communicate with the rest of router 100 over redundant control buses. The placement of individual modules within the rack is not addressed in this document, since there are no architectural preferences, or restrictions, on such choices.

Level-1 Processor/System Controller

A system controller (also referred to herein as a level-1 processor) provides overall control of router 100. The system controller also communicates with the system switches. The system controller includes a bus such as an all-purpose bus (APB), which in turn provides access to several bus and communications controllers. Among the controllers interfaced to the APB is a bus bridge, a peripheral interface, and an I/O interface. The I/O interface may provide functionality such as 10 Mbps/100 Mbps Ethernet communications. The I/O interface also supports peripherals such as keyboards, mice, floppy drives, parallel ports, serial ports, and the like. The bus bridge allows communications between the system controller's processor and other devices. The peripheral interface allows communications with peripherals such as hard disks. The system controller performs various functions, such as communicating with the route processor (s) to determine how the matrix should be configured, managing the router's resources, and similar duties.

APB may also be connected to a dual-channel serial communication controller (SCC), for example, which can be used to communicate with one or more remote Operations Systems (OS) using, for example, the X.25 protocol. For more OS links and higher link speeds, the user can optionally install one or more WAN Interface Modules in the management bay. Such modules, which preferably handle all real-time aspects of the OS link, including layer-2 of the OSI stack, communicate with the system controller.

Main Matrix Bay

Switching matrix 130 is based on a rearrangeably non-blocking switching matrix and can consist, for example, of switch nodes arranged in a staged array. For example, switching matrix 130 configured as a 256×256 switching matrix consists of 48 nodes arranged in an array of 16 rows by 3 columns, with each column containing one stage. All 48 nodes in the switch matrix are substantially similar. Each node is preferably a crossbar device, such as a 16×16 crossbar device that allows any of its 16 inputs to be connected to any of its 16 outputs, regardless of the crossbar's current state.

Figure 5:
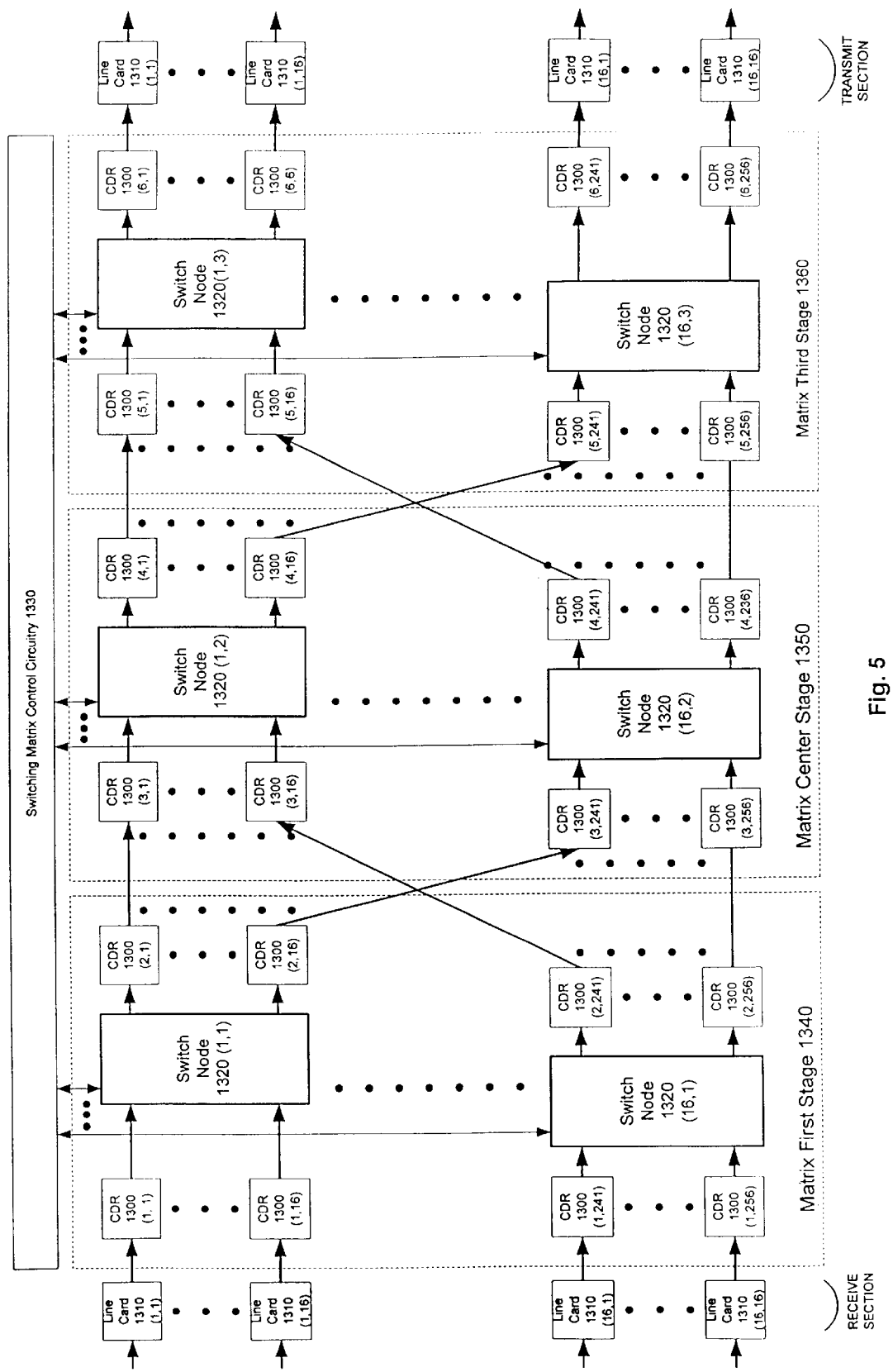
FIG. 5 illustrates a view of a switching matrix that includes clock/data recovery units and connections to the line cards.

FIG. 5 illustrates a simplified view of switching matrix 130, including connections to the line cards. The depiction of switching matrix 130 in FIG. 5 shows certain other details, such as clock/data recovery units (CDRs) 1300(1,1)–(6,256) and line cards 1310(1,1)–(16,16). A CDR recovers clock and data information from a serial bitstream by recovering the clocking signal from the incoming bitstream (e.g., using a phase-locked loop (PLL)), and then recovering the data using the clock thus recovered.

It will be noted that line cards 1310(1,1)–(16,16) correspond loosely to line cards 220(1,1)–(N,N), as depicted in FIG. 2. It will also be noted that line cards 1310(1,1)–(16,16) are each shown as being divided into a receive section and a transmit section as shown in FIG. 5, again in a fashion similar to that depicted in FIG. 2. Also depicted in FIG. 5 are switch nodes 1320(1,1)–(16,3) and a switching matrix control circuit 1330. More generically, the control function represented by switching matrix control circuitry 1330 is depicted in FIG. 3 as matrix shelf processors 370(1)–(N) and 371 (1)–(N). As previously noted, switch nodes 1320(1,1)–(16,3) and their related CDRs are divided into three stages, which are depicted in FIG. 5 as matrix first stage 1340, matrix center stage 1350, and matrix third stage 1360. It will be noted that matrix first stage 1340, matrix center stage 1350, and matrix third stage 1360 correspond to the matrix stages represented by switch nodes 1320(1,1)–(16,1), switch nodes 1320(1,2)–(16,2), and switch nodes 1320(1,3)–(16,3). It will also be noted that the transmit side of line cards 1310(1,1)–(16,16) each include CDR functionality.

SONET Frame

FIG. 6 illustrates a standard frame of the synchronous optical network (SONET) protocol, exemplified here by a SONET frame 1500. SONET frame 1500 is divided horizontally into ninety columns and is divided vertically into nine rows. The first three columns of SONET frame 1500 contain overhead bytes used for framing, communications, and other purposes. The remaining 87 columns contain data and are collectively referred to as payload. The overhead bytes include an A1 byte 1502, an A2 byte 1504, a J0/Z0 byte 1506, a B1 byte 1510, an E1 byte 1512, an F1 byte 1514, a D1 byte 1520, a D2 byte 1522, a D3 byte 1524, an H1 byte 1530, an H2 byte 1532, an H3 byte 1534, an H4 byte 1536, a B2 byte 1540, a K1 byte 1542, a K2 byte 1544, a D4 byte 1550, a D5 byte 1551, a D6 byte 1552, a D7 byte 1553, a D8 byte 1554, a D9 byte 1555, a D10 byte 1556, a D11 byte 1557, a D12 byte 1558, an S1/Z1 byte 1570, an M1/Z2 byte 1572, and an E2 byte 1574. Also included in SONET frame 1500 is payload data, represented here by payload bytes 1590-1598. It will be noted that each of payload bytes 1590–1598 includes 87*48 bytes of data for an OC-48 SONET frame (except payload bytes 1593, which includes 86*48 bytes of data (due to the existence of H4 byte 1536)).

Concatenated Payloads

For a SONET system to function as an OC-192 system, data payloads are typically concatenated for transmission. Accordingly, integrated circuits, such as ASICs, are coupled to transmit the data.

Figure 7:
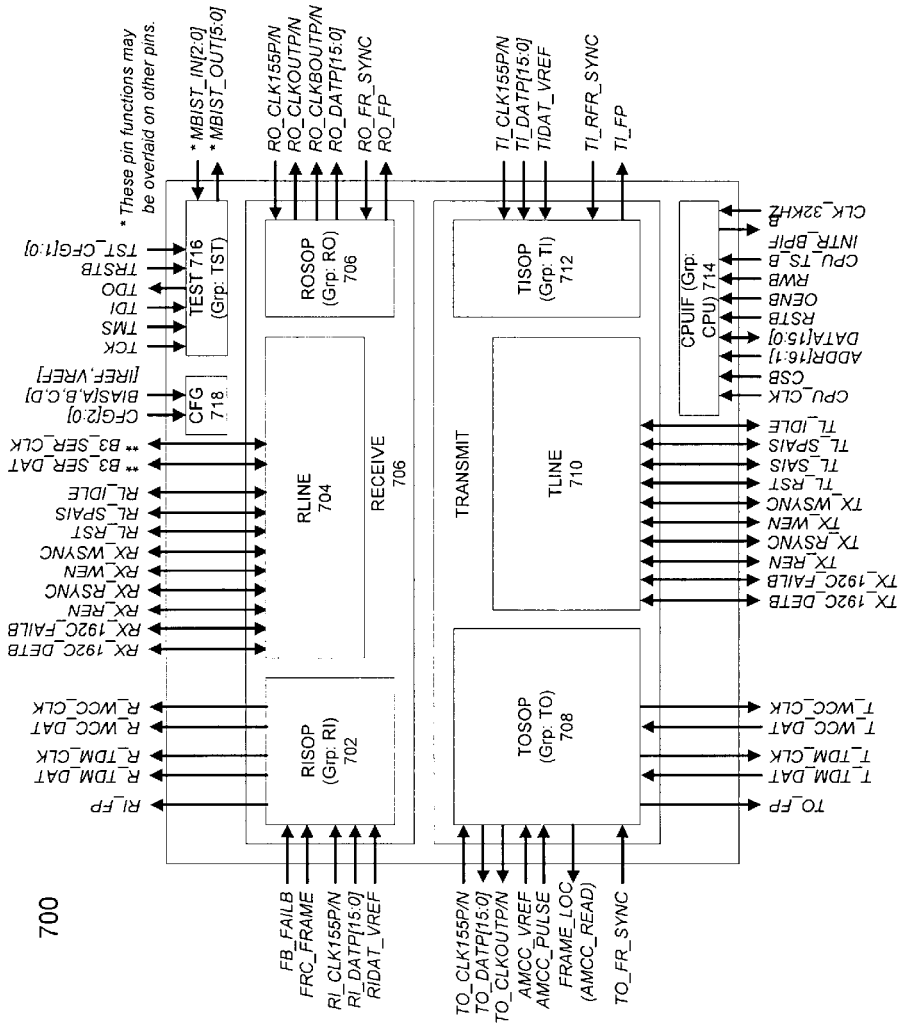
FIG. 7 illustrates a processor in accordance with an embodiment of the present invention.
Figure 8:
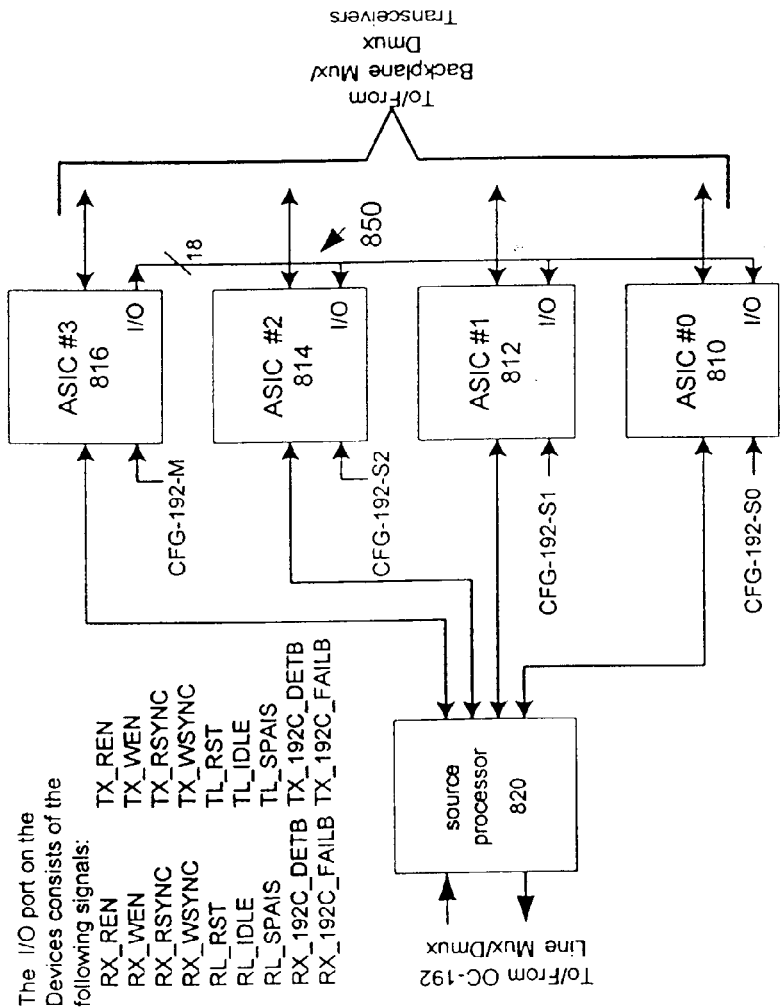
FIG. 8 illustrates a concatenation scheme in accordance with an embodiment of the present invention.

FIG. 7, shows a processor 700, including pin descriptions allowing the processor to function as either a master or a slave processor in a line card. FIG. 8 demonstrates several processors, such as the processor shown in FIG. 7, coupled in a manner consistent with an embodiment of the present invention.

Referring now to Table 1, below, a typical STS SPE (STS Synchronous Payload Envelope) payload pointer for a SONET system is shown in bits 7 through 16. The table shows bits seven through sixteen are designated either "I" for an increment or "D" for decrement. These bits are typically designated as the pointer value to indicate the offset between the pointer word and the first byte of the STS SPE. In a concatenated payload, in which more than one STS-1 is used to carry an SPE, these bits are used to carry a concatenation indicator in the second through the nth STS-1. Thus, the concatenation detection requires the detection of the pointer word value to serially pass from the nth STS-1 to the first STS-1.

TABLE 1

| H1 byte | H2 byte | H3 byte | Byte 0 of payload |
|---|---|---|---|
| 1 2 3 4 5 6 7 8<br>N\|N\|N\|N\|—\|—\|I\|D | 9 10 11 12 13 14 15 16<br>I\|D\|I\|D\|I\|D\|I\|D | . . .<br>Negative Stuff Byte | . . .<br>Positive Stuff Byte |

FIG. 8 includes a concatenated group of STS-1s in an STS-Nc dispersed across processors 810, 812, 814 and 816. Each of the STS-1 s contain part of the STS-Nc SPE rather than individual STS-1 SPEs.

According to the GR-253 specification, the STS-1s contain concatenation indicators contained in payload pointers of the second through nth STS-1s in an STS-Nc. The concatenation indicators show that the second through nth STS-1s each contain part of the STS-Nc SPE. The STS-1 in the master processor 816 would not typically have a concatenation indicator, but holds a normal pointer word. STS-1 s in processors 810, 812 and 814 each have pointer values shown in bits 7 through 16 set to all ones, with N-bits set to 1001, giving a pointer word value of: 1001XX11 11111111. The pointer word value appears in the H1 and H2 bytes on the second through the nth STS-1s, commonly referred to as "slave channels."

The GR-253 specification provides for concatenation detection by integrating the detection of the pointer word value over a number of frames. Accordingly, if a large concatenated signal is present, such as that required in an STS-192c payload, the integration data for each channel passes from integrated circuit to integrated circuit.

The present invention includes a method for channeling the STS-N signals in a SONET packet such that the data is ordered for efficient switching by switching matrix 130. The STS-N signals are de-multiplexed into portions and each portion is communicated to an STS-N pointer processor. The order in which the portions are communicated differs from the standard SONET de-multiplexing order. In one embodiment, the STS-N pointer processor is implemented as an ASIC. While the STS-N pointer processor is also referred to herein as an STS-N pointer processor ASIC, other implementations of an STS-N pointer processor are within the scope of the invention.

STS-N signals are sent from a line card 400 to the switching matrix 130 as part of the payload of a SONET packet. According to an embodiment of the present invention, each line card 400 on router 100 includes at least two ASICs. A first ASIC functions as a line overhead processor and de-multiplexer. The remaining ASICs of the at least two ASICs include at least one STS-N pointer processor ASIC. The number of STS-N pointer processor ASICs included on each line card 400 is limited by the bandwidth of the switching matrix 130.

Starting at the beginning of the SONET packet, an STS-N signal is obtained. The first ASIC processes the line overhead and de-multiplexes the signal. The signal is divided into portions and transmitted to STS-N pointer processor according to the present invention. Every STS-N signal in a SONET packet is processed in the manner described below.

It is desired that each STS-N pointer processor receives data ordered such that the concatenated STS-N signal is processed by a selected STS-N pointer processor ASIC. Table 2 shows the variables used to determine one of the at least one STS-N pointer processor ASICs to receive bytes from an STS-N signal.

TABLE 2

| Variable | Contents | Calculation |
|---|---|---|
| A | Number of STS-1s received on each line card | |
| B | Number of STS-N pointer processor ASICs on each line card | |
| C | Number of STS-1 channels for each STS-N pointer processor ASIC | A/B |
| D | Number of contiguous channels. The value of the D variable is used to determine the number of portions into which the signal is divided, and consequently which STS-N pointer processor ASICs will receive the portion. | C/3 |

The STS-N signal is divided into portions, where each portion contains D bytes. As an example, an OC-192 line card with 4 STS-N pointer processor ASICs has the following variables: A=192, B=4, C=192/4=48, and D=48/3=16. With a D of 16, the STS-N signal is divided into portions each containing 16 bytes. N/16 portions result.

Each portion of the STS-N signal is transmitted in turn to a selected STS-N pointer processor, with the STS-N pointer processors being selected in a cyclical order. When all portions of the STS-N signal have been transmitted, the next STS-N signal from the SONET packet is obtained.

In our example, a first portion includes the first 16 bytes of the STS-N signal. The first portion is transmitted to a first STS-N pointer processor ASIC. The second portion includes the second 16 bytes of the STS-N signal. The second portion is transmitted to a second STS-N pointer processor ASIC. Remaining third and fourth portions include 16 bytes each and each portion is transmitted to its respective third and fourth STS-N pointer processor ASIC.

Table 3 shows an example of ordering portions of an STS-N signal to be processed by a selected STS-N pointer processor, according to one embodiment of the present invention.

| STS-N Pointer Processor ASICs | Bytes of STS-N signal received |
|---|---|
| 1 | 1–16, 65–80, 129–144 |
| 2 | 17–32, 81–96, 145–160 |
| 3 | 33–48, 97–112, 161–176 |
| 4 | 49–64, 113–128, 177–192 |

This transmission pattern is repeated for each STS-N signal included in the entire SONET frame. Using this transmission pattern minimizes the complexity of the interface and creates independent portions that are transmitted into the switching matrix 130 and switched to a line card.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A method for a communication circuit, the method comprising:

ordering a plurality of signals of a first type in one or more line cards for transmit to one or more types of line cards, wherein the ordering of the first type of signals creates a plurality of independent signals of a second type; and transmitting the plurality of the first type of signals to the one or more types of line cards, wherein the independence of the signals of the second type permits the signals of the second type to be in an arbitrary order.

2. The method of claim 1 wherein the permitting the signals of the second type to be in an arbitrary order eliminates a need to reorder the plurality of the first type of signals in a switching matrix.

3. The method of claim 1 further comprising:

demultiplexing the plurality of signals of the first type in a switching matrix, wherein the demultiplexing is independent of reducing the plurality of signals of the first type to a basic module.

4. The method of claim 3 wherein the basic module is a synchronous transport signal at level 1.

5. The method of claim 1 wherein the communication circuit is disposed in a synchronous optical network (SONET).

6. The method of claim 1 further comprising:

matching the plurality of the first type of signals from the line card to one or more types of line cards in a predetermined order.

7. The method of claim 1, wherein the plurality of signals of the first type are synchronous transport signals (STS) having N modules (STS-N), the ordering further including:

assigning to a variable A a number of basic modules on the one or more line cards;

assigning to a variable B a number of processors adapted for STS-N signals on the one or more line cards;

calculating a variable C by dividing A by B, C being the number of basic module channels for channels common to each of the processors;

calculating a variable D by dividing C by three, D being a number of contiguous channels;

dividing each STS-N signal into N/D portions, each portion including up to D bytes; and for each portion of the STS-N signal,
selecting one of the number of processors adapted for STS-N signals; and
transmitting the portion of the STS-N signal to the one of the number of processors.

8. The method of claim 7 wherein the STS-N signal is a concatenated signal of concatenated lower level modules.

9. The method of claim 7, wherein:

the B processors are ordered in a cycle; and selecting the one of the number of processors includes using a next processor in the cycle.

10. The method of claim 7, wherein the STS-N signal is received as payload of a synchronous optical network (SONET) packet.

11. The method of claim 7, wherein at least one of the processors is implemented as an application specific integrated circuit (ASIC).

12. An apparatus disposed in a communication system, the apparatus comprising:

one or more line cards configured to transmit a plurality of signals of a first type to one or more types of line cards, the plurality of signals in a predetermined order, the order of the plurality of signals creating a plurality of independent signals of a second type;

one or more types of line cards coupled to receive the plurality of the first type of signals, wherein the independence of the signals of the second type permits the signals of the second type to be in an arbitrary order.

13. The apparatus of claim 12 wherein the further comprising:

demultiplexer coupled to the one or more line cards, the demultiplexer configured to demultiplex the plurality of signals of the first type in a switching matrix, wherein the demultiplexing is independent of reducing the plurality of signals of the first type to a basic module.

14. The apparatus of claim 13 wherein the basic module is a synchronous transport signal at level 1.

15. The apparatus of claim 13 wherein the communication system is a synchronous optical network (SONET).

16. The apparatus of claim 13, wherein the plurality of signals of the first type are synchronous transport signals (STS) having N modules (STS-N), the predetermined order being determined by a program including:

an A module configured to assign to a variable A a number of basic modules on the one or more line cards;

a B module configured to assign to a variable B a number of processors adapted for STS-N signals on the one or more line cards;

a C module configured to calculate a variable C by dividing A by B, C being the number of basic module channels common to each of the processors;

a D module configured to calculate a variable D by dividing C by three, D being a number of contiguous channels;

a transmit module configured to divide each STS-N signal into N/D portions, each portion including up to D bytes; and for each portion of the STS-N signal,
select one of the number of processors adapted for STS-N signals; and
transmit the portion of the STS-N signal to the one of the number of processors.

17. The apparatus of claim 16 wherein the STS-N signal is a concatenated signal of concatenated lower level modules.

18. The apparatus of claim 16, wherein:
the B processors are ordered in a cycle; and
the transmit module selects the one of the number of processors and uses a next processor in the cycle.

19. The apparatus of claim 16, wherein the STS-N signal is received as payload of a synchronous optical network (SONET) packet.

20. The apparatus of claim 13 wherein the one or more line cards are disposed on an application specific integrated circuit (ASIC).

21. The apparatus of claim 16 wherein the processors adapted for STS-N signals are implemented on one or more ASICs.

22. A computer program product for communication, the computer program product comprising:

signal bearing media bearing programming comprising instructions that:
order a plurality of signals of a first type in one or more line cards for transmit to one or more types of line cards, wherein the ordering of the first type of signals creates a plurality of independent signals of a second type; and
transmit the plurality of the first type of signals to the one or more types of line cards, wherein the independence of the signals of the second type permits the signals of the second type to be in an arbitrary order.

23. A communication system comprising:

means for ordering a plurality of signals of a first type in one or more line cards for transmit to one or more types of line cards, wherein the ordering of the first type of signals creates a plurality of independent signals of a second type; and means for transmitting the plurality of the first type of signals to the one or more types of line cards, wherein the independence of the signals of the second type permits the signals of the second type to be in an arbitrary order.

24. The communication system of claim 23 wherein the means for permitting the signals of the second type to be in an arbitrary order eliminates a need to reorder the plurality of the first type of signals in a switching matrix.

25. The communication system of claim 23 further comprising:

means for demultiplexing the plurality of signals of the first type in a switching matrix, wherein the means for demultiplexing is independent of reducing the plurality of signals of the first type to a basic module.

26. The communication system of claim 25 wherein the basic module is a synchronous transport signal at level 1.

27. The communication system of claim 23 wherein the communication system is disposed in a synchronous optical network (SONET).

28. The communication system of claim 23 further comprising:

means for matching the plurality of the first type of signals from the line card to one or more types of line cards in a predetermined order.

29. The communication system of claim 23, wherein the plurality of signals of the first type are synchronous transport signals (STS) having N modules (STS-N), the means for ordering further including:

means for assigning to a variable A a number of basic modules on the one or more line cards;

means for assigning to a variable B a number of processors adapted for STS-N signals on the one or more line cards;

means for calculating a variable C by dividing A by B, C being the number of basic module channels for channels common to each of the processors;

means for calculating a variable D by dividing C by three, D being a number of contiguous channels;

means for dividing each STS-N signal into N/D portions, each portion including up to D bytes; and for each portion of the STS-N signal,
means for selecting one of the number of processors adapted for STS-N signals; and
means for transmitting the portion of the STS-N signal to the one of the number of processors.

30. The communication system of claim 29 wherein the STS-N signal is a concatenated signal of concatenated lower level modules.

31. The communication system of claim 29, wherein:
the B processors are ordered in a cycle; and
the means for selecting the one of the number of processors includes means for using a next processor in the cycle.

32. The communication system of claim 29, wherein the STS-N signal is received as payload of a synchronous optical network (SONET) packet.

33. The communication system of claim 29, wherein at least one of the processors is implemented as an application specific integrated circuit (ASIC).

* * * * *